Feb. 12, 1957  W. H. CILKER  2,780,998
FIRE PUMP
Filed March 12, 1951  11 Sheets-Sheet 1

INVENTOR
WILLIAM H. CILKER

BY Hans G. Hoffmeister

ATTORNEY

Feb. 12, 1957 W. H. CILKER 2,780,998
FIRE PUMP
Filed March 12, 1951 11 Sheets-Sheet 3

INVENTOR
WILLIAM H. CILKER
BY Hans G. Hoffmeister
ATTORNEY

Feb. 12, 1957 W. H. CILKER 2,780,998
FIRE PUMP
Filed March 12, 1951 11 Sheets-Sheet 4

INVENTOR
WILLIAM H. CILKER
BY Hans G. Hoffmeister
ATTORNEY

Feb. 12, 1957 W. H. CILKER 2,780,998
FIRE PUMP
Filed March 12, 1951 11 Sheets-Sheet 6

FIG_6

INVENTOR
WILLIAM H. CILKER

BY Hans G. Hoffmeister
ATTORNEY

Feb. 12, 1957 W. H. CILKER 2,780,998
FIRE PUMP
Filed March 12, 1951 11 Sheets-Sheet 11

PARALLEL

SERIES

INVENTOR
WILLIAM H. CILKER

BY
ATTORNEY

United States Patent Office 2,780,998
Patented Feb. 12, 1957

2,780,998

FIRE PUMP

William H. Cilker, Los Gatos, Calif., assignor to Food Machinery and Chemical Corporation, San Jose, Calif., a corporation of Delaware Application March 12, 1951, Serial No. 215,060

10 Claims. (Cl. 103—106)

The present invention relates to pumps, and more specifically to a series parallel liquid pump of a type particularly suited for use on fire engines.

An object of the present invention is to provide an improved series parallel pump.

Another object is to improve the valve and duct arrangements of a series parallel pump.

Another object is to provide an improved manifolding arrangement for a series parallel pump.

Another object is to control the flow of liquid through a series parallel pump by means of a single simple positive acting valve to provide a smooth flow of liquid with minimum hydraulically induced power losses even under severe operating conditions.

Another object is to provide a pump wherein maintenance is facilitated by providing for easy removal and replacement of the impeller section.

Another object is to incorporate vehicle parking brake mounting facilities as part of a pump combination.

These and other objects and advantages of the present invention will be apparent from the following description and the accompanying drawings, wherein:

Fig. 3 is a rear elevation of the pump shown in Figs. 1 and 2.

In the illustrated embodiment of the invention a manifold section A (Fig. 1) is adapted to be mounted transversely across the frame channels 26 and 27 of the chassis of an automotive vehicle, such as an ordinary automobile truck to support the pump assembly thereon. The manifold A has a single rotary control valve B incorporated therein. An impeller section C is secured to the underside of the manifold A to be suspended therefrom, and a drive or gear housing section D is secured to a side of the impeller section and also to the manifold A. By this arrangement the entire impeller section C can be easily removed for inspection, replacement or repair when necessary without disturbing either the manifold A or the gear housing section D. All plumbing and accessory equipment, not shown, necessary for the operation of the pump or of the vehicle upon which it is mounted should be installed clear of the forward side of the impeller section so as not to interfere with its easy removal.

The mechanism of the gear housing section D is adapted to provide selective driving connection between the pump and a suitable prime mover, not shown, such as the engine of the motor vehicle upon which the pump is mounted.

Figure 1:
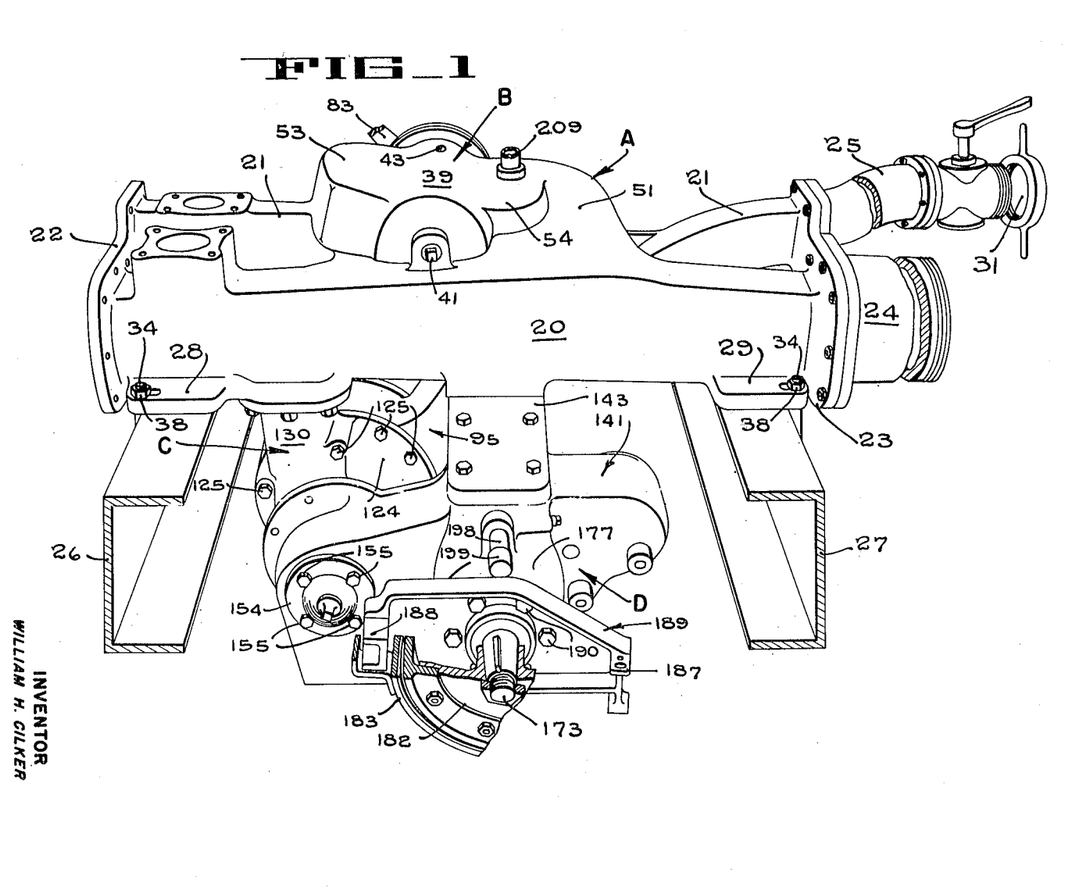
Fig. 1 is a perspective rear view of a pump embodying the present invention as it would appear mounted on the side frame channels of the chassis of an automobile vehicle, portions of hose transition fittings, the vehicle side channels and the drive mechanism being broken away and other portions being omitted.
Figure 2:
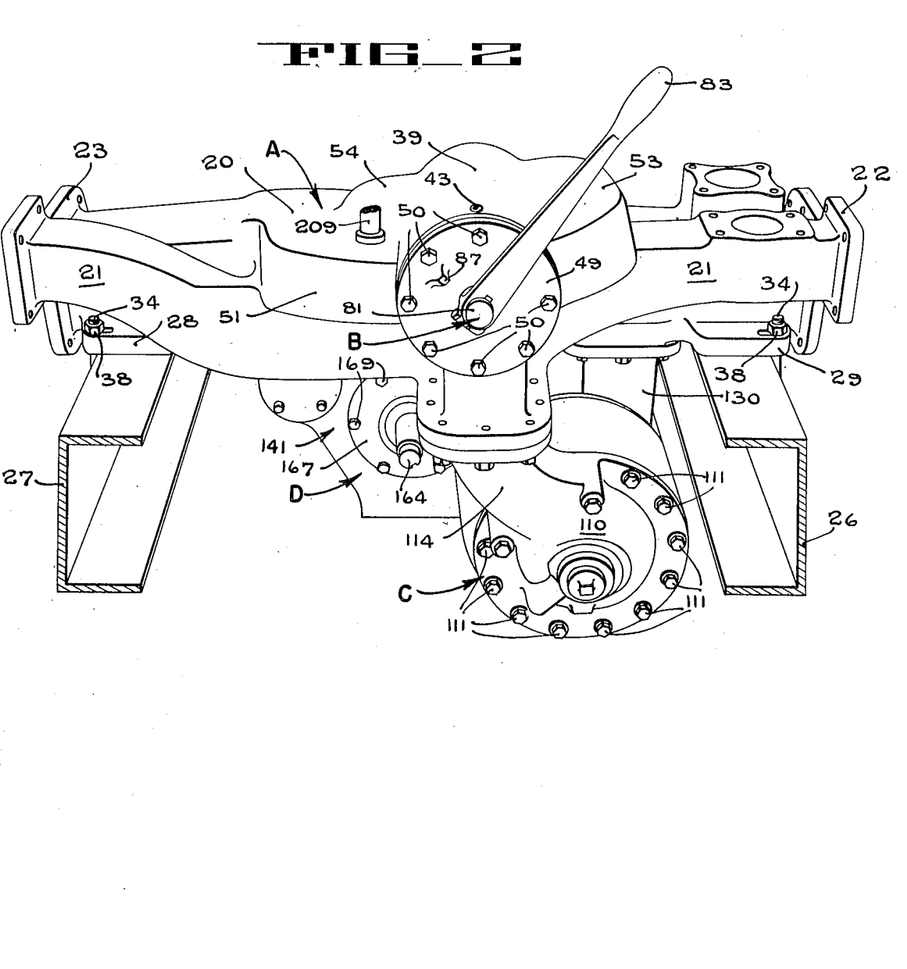
Fig. 2 is a similar perspective front view of the pump shown in Fig. 1.
Figure 5:
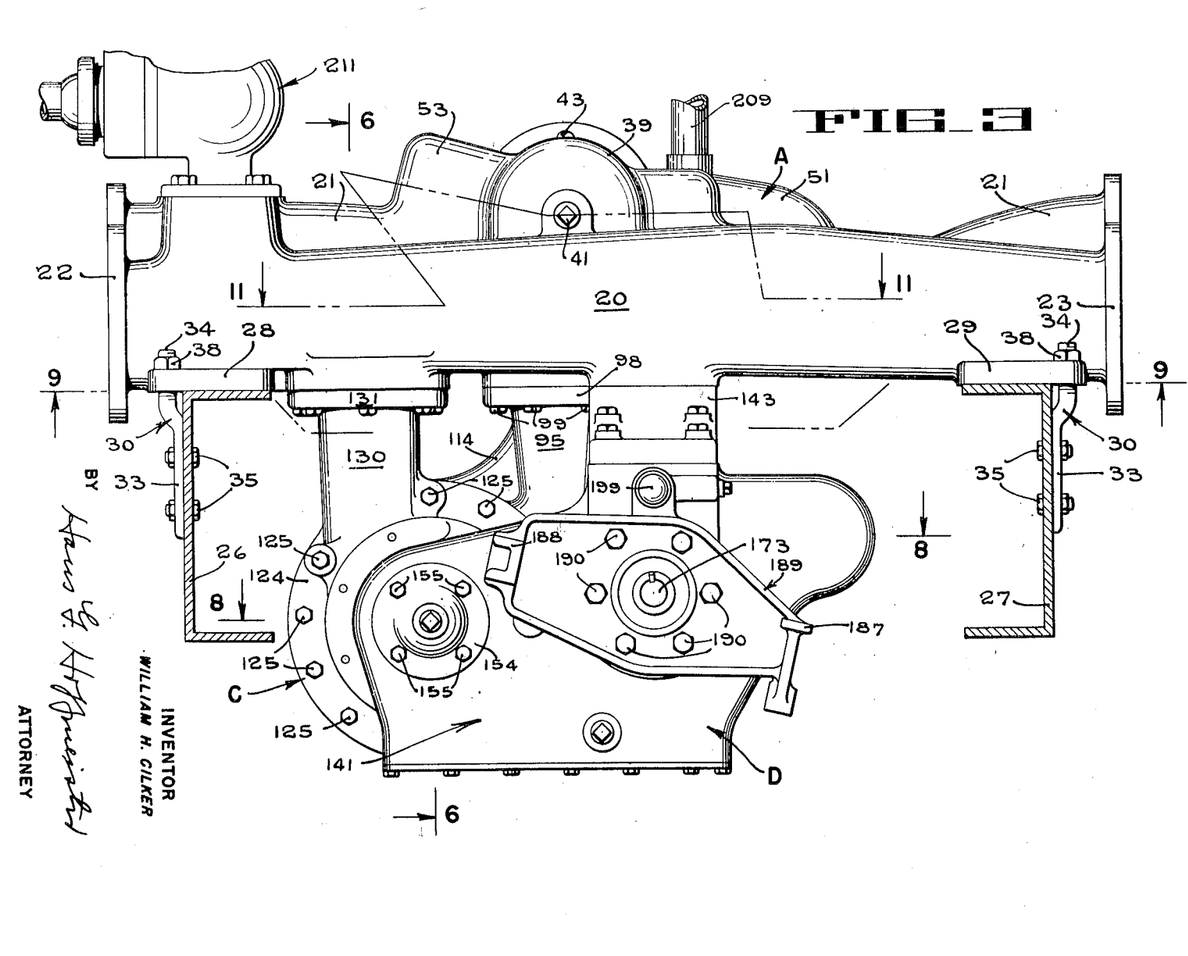
Fig. 5 is a vertical section taken along line 5—5 of Fig. 6.

The manifold section A is made from a cored casting, having a relatively straight main inlet conduit 20 which extends the entire length of the manifold, and is open at both of its ends (Fig. 5). An open ended main discharge conduit 21, slightly smaller than the intake conduit 20, is formed to extend alongside the intake conduit the entire length of the manifold. The main conduits 20 and 21 are joined together at their ends by flanges 22 and 23, each of which serves as a mounting for conventional inlet and outlet hose connecting extensions 24 and 25 (Fig. 1). Usual closure caps 31 are provided for any of the hose extensions not in use.

Mounting pads 28 and 29 (Figs. 1, 2, 3 and 4) are formed on the underside of the inlet conduit 20, near the ends thereof, and are adapted to rest on the chassis frame channel members 26 and 27, respectively, of the motor driven vehicle, not shown, on which the pump is mounted. The mounting pads 28 and 29 are secured to the chassis members 26 and 27 by anchor members 30 each of which has a plate-like lower portion 33 (Fig. 3) and a threaded, upwardly extending shank portion 34. The lower plate portions 33 of these anchor members are secured to the outer sides of the frame channels 26 and 27 by bolts 35, and the shank portions 34 are inserted through slotted openings provided therefor in the mounting pads 28 and 29. Nuts 38, screwed onto the threaded shank portions 34, are drawn down to secure the mounting pads firmly in position on the chassis channel frame members.

Figure 4:
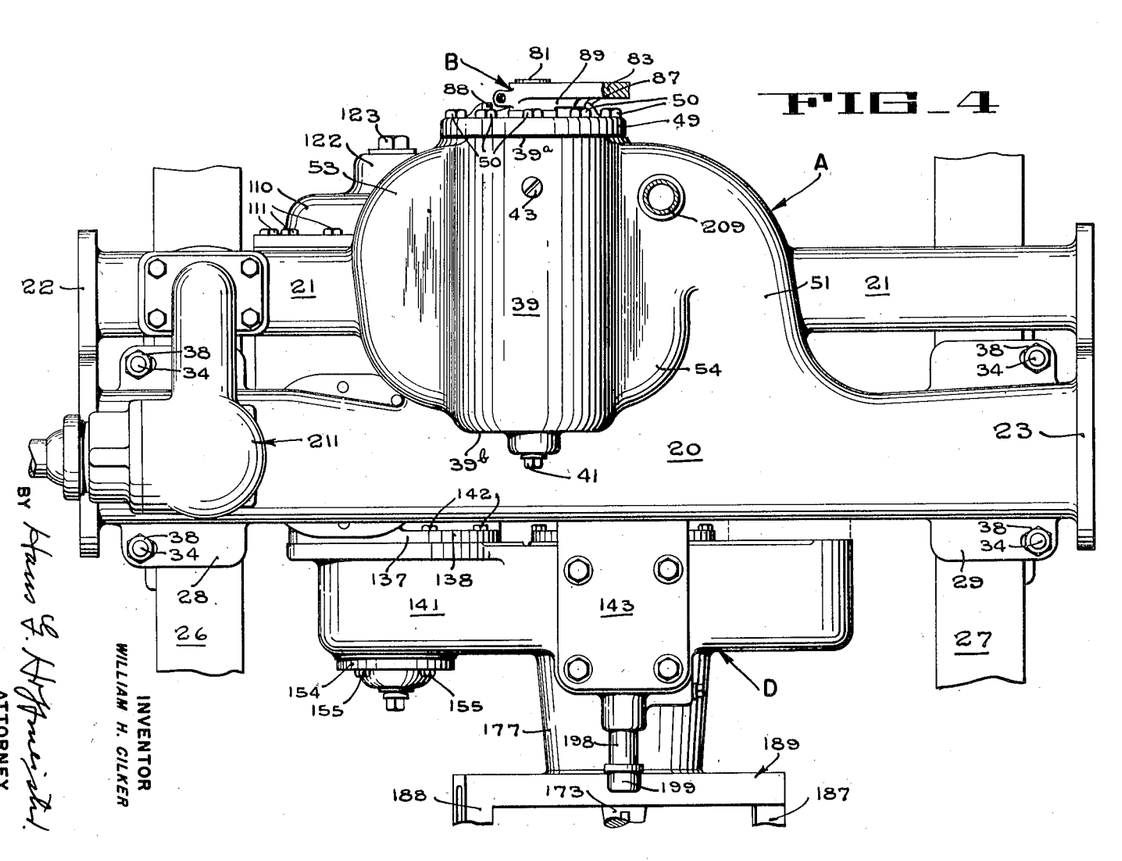
Fig. 4 is a plan view of the pump shown in Figs. 1 to 3.
Figure 6:
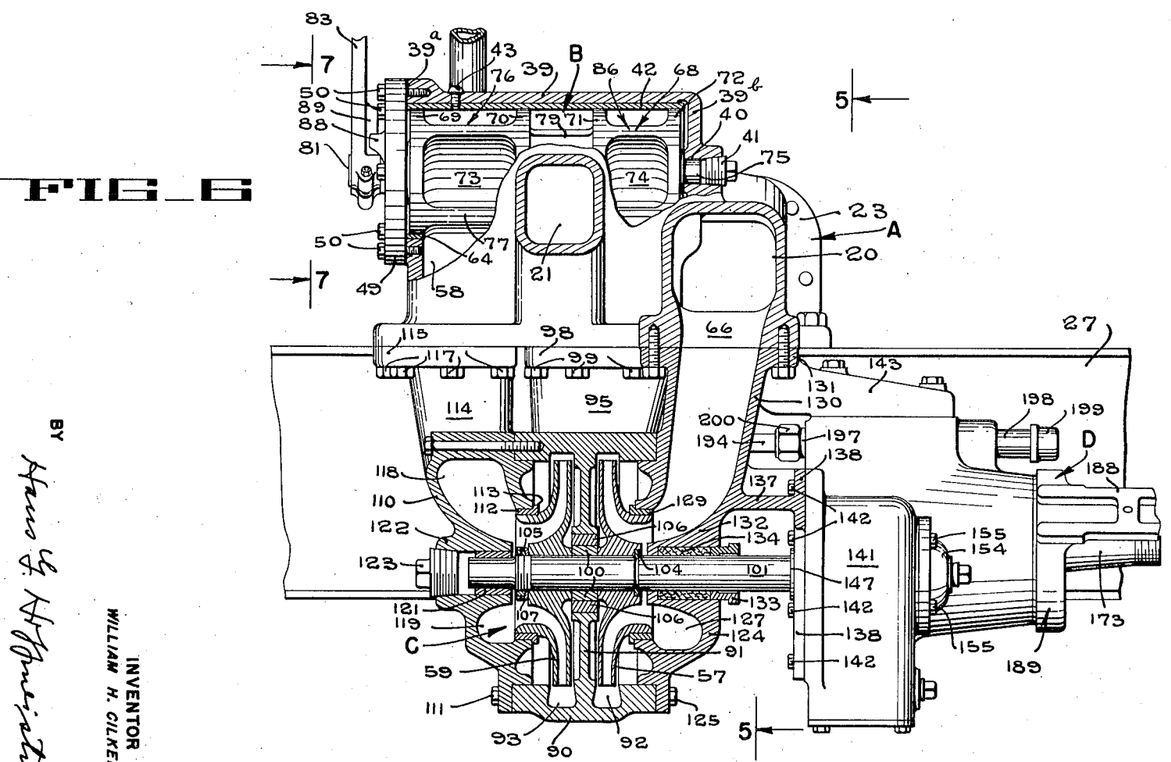
Fig. 6 is a vertical section taken along line 6—6 of Fig. 3, portions thereof being broken away.

A cylindrical valve body or housing 39 (Figs. 1, 2, 3, 4, 5, 6, 10, 11 and 12) is cast integrally with the manifold A, with its axis disposed horizontally, and extending transversely across the main discharge conduit 21 (Figs. 4 and 6). One end 39a of the valve housing 39 is open (Fig. 6) and its other end 39b is closed, the closed end having a cylindrical bearing surface 40 formed therein co-axially of the valve housing, rotatively to support one end of a valve core to be described later herein. The closed end of the valve housing axially outwardly beyond the bearing surface 40, is sealed off by means of a conventional tapered threaded plug 41.

The bore of the valve housing 39 is machined to a cylindrical surface, and a tubular, bronze liner 42 is fitted therein and is secured in rotatively adjusted position by a set screw 43 (Figs. 2, 3, 4 and 6). A radially extending flange 44 (Fig. 10), around the outer end of the line 42, is adapted to be gripped in sealing relation between a seat 45 provided marginally around the open end 39a of the valve housing 39, and the bottom of an annular groove 48 in a closure plate 49, secured by cap screws 50 over the open end of the valve housing 39. The valve liner 42 (Figs. 6, 10, 11, 12, 14 and 15) has a plurality of ports at each end thereof adapted to communicate with various passages formed in the manifold A and opening into the interior of the valve liner. All of the ports in each end of the valve liner are of the same size and shape as the others therein, although the ports in one end of the liner are not necessarily the same size and shape as those in the other end.

From the main inlet conduit 20 a curved branch inlet passage 51 extends transversely of the manifold A and opens into the interior of the valve housing 39 at the end thereof farthest from its juncture with the main inlet conduit 20. The transversely extending passage 51 is flared outwardly at 52 (Fig. 11) to admit fluid freely thereto from either end of the intake conduit as desired. The present invention avoids the necessity for abrupt changes in direction or cross sectional area of the liquid passages and allows all of the passages to be designed to conform smoothly with each other for effective hydraulic flow.

Other passages opening into the valve housing include a curved crossover passage 53 (Figs. 4, 5, 11 and 12) which communicates between the interior of opposite end portions of the valve housing 39. A short curved passage 54 (Figs. 10, 11 and 12) opens from the interior of the valve housing 39, at the end thereof nearest the inlet conduit 20, into the main discharge conduit 21. A passage 55 (Figs. 10, 11 and 12) opens downwardly, from the end portion of the valve housing 39 nearest the main inlet conduit 20, and communicates with the discharge side of a first stage impeller 57, to be described later herein. A passage 58 also opens downwardly from the opposite end portion of the valve housing 39 and communicates with the intake side of a second stage impeller 59, also to be described later herein.

Figure 10:
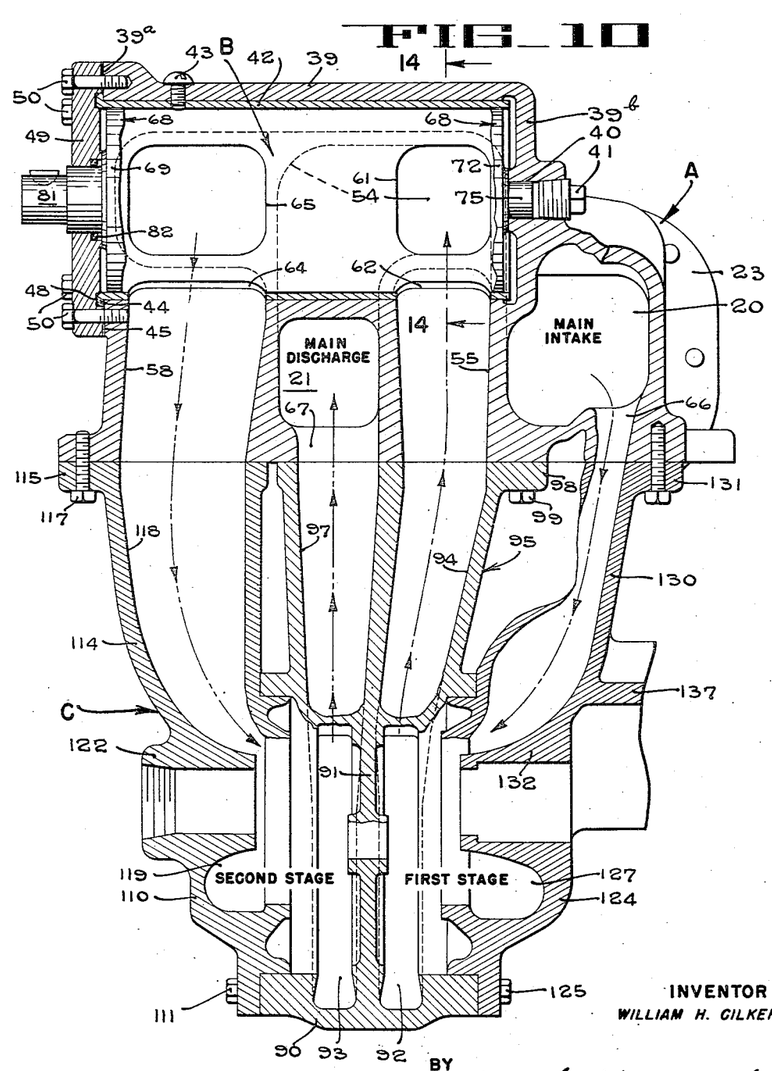
Fig. 10 is an enlarged, somewhat diagrammatic section through the impeller housing, manifold and valve housing taken substantially along the line 10—10 of Fig. 5, with the impellers removed and the valve core broken away, a portion of an inlet passage ahead of the plane of section being included to facilitate an understanding of the various flow paths of the liquid in passing through the pump.
Figure 11:
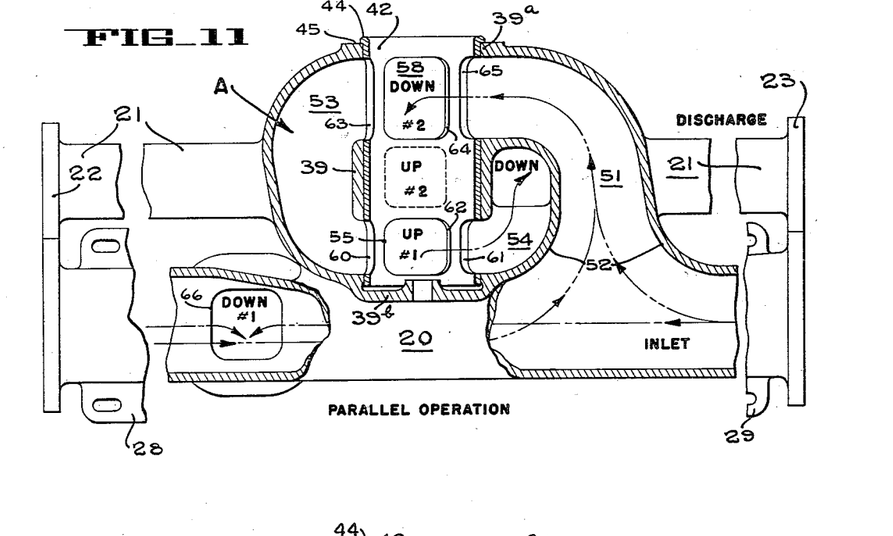
Fig. 11 is a fragmentary, somewhat diagrammatic section of the central portion of the manifold section taken along line 11—11 in Fig. 3, the valve core being removed and portions of the manifold being broken away, the arrows on the dash-and-dot lines indicating the paths the liquid follows in flowing through the pump with the valve core adjusted for parallel operation.
Figure 12:
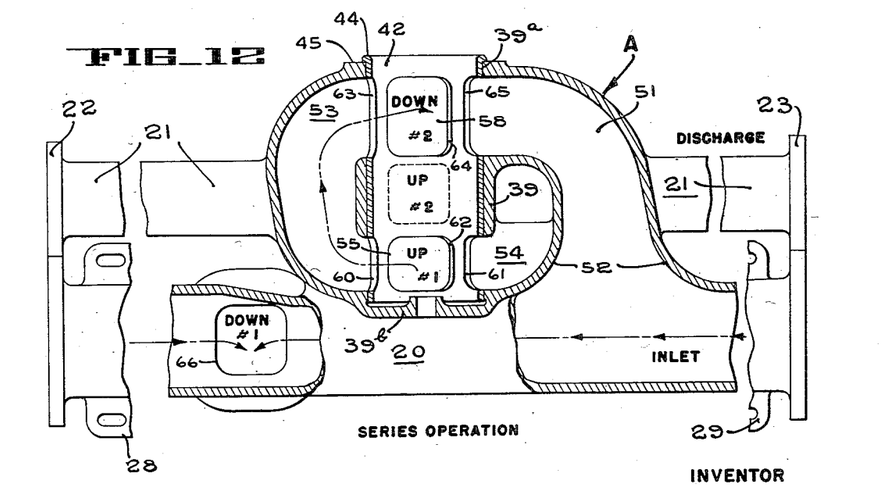
Fig. 12 is a view similar to Fig. 11, the arrows on the dash-and-dot lines showing the paths the liquid follows in flowing through the pump with the valve core adjusted for series operation.
Figure 13:
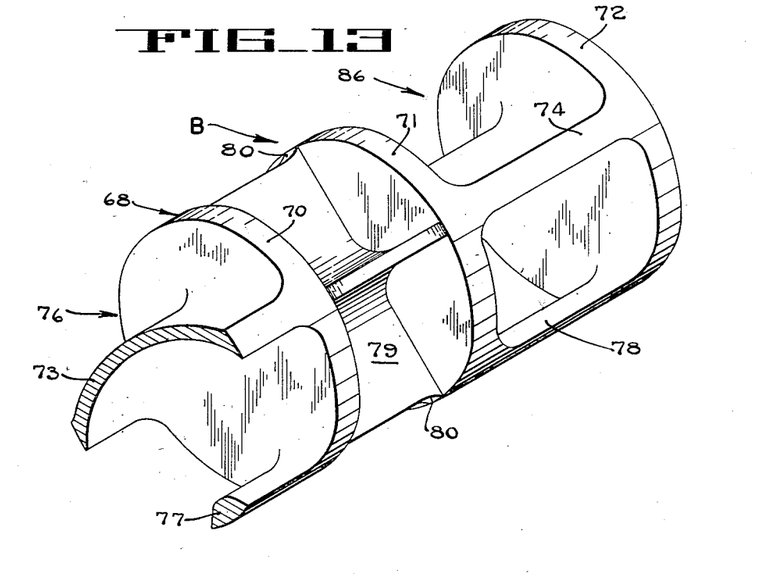
Fig. 13 is an enlarged fragmentary perspective view of the valve core, one end thereof being broken away to show a deflector plate and post which defined a curved passage through the core.

The valve liner 42 has three ports 60, 61 and 62 (Figs. 10, 11 and 12) in the end thereof nearest the inlet conduit, and these ports communicate, respectively, with the manifold passages 53, 54 and 55 when the valve liner 42 is secured in its properly adjusted position by the set screw 43. Three ports 63, 64 and 65 are also provided in the other end of the valve liner 42 to register with the manifold passages 53, 58 and 51, respectively. The two sets of valve sleeve ports are aligned longitudinally in pairs as shown in Figs. 10, 11 and 12.

In addition to the passages in the manifold A which open into the valve housing 39, the manifold has two openings 66 and 67 in its under side (Figs. 5, 10, 11 and 12) which open, respectively, directly into the main inlet and discharge conduits 20 and 21 without communicating with the valve housing 39. These openings 66 and 67 communicate, respectively, with the intake of the first stage impeller 57, and the discharge from the second stage impeller 59, these connections being constant for both parallel and series operation of the pump.

A valve core 68, fitted into the valve liner 42 (Figs. 6, 10, 13, 14 and 15) has four axially aligned disc-like partitions 69, 70, 71 and 72 thereon adapted to have substantially liquid tight rotative fit in the valve liner 42. The partitions 71 and 72 are spaced apart so as to be disposed on opposite ends of the three ports 60, 61 and 62 in the end of the valve liner 42 nearest the inlet conduit 20, and thus define a valve chamber 86 at one end of the valve housing. The other two partitions 69 and 70 are spaced apart so as to be disposed on opposite ends of the ports 63, 64 and 65 in the other end of the valve liner 42, and thus define a second valve chamber 76 spaced from the first valve chamber 86.

An integrally formed, curved, deflector plate 73 (Figs. 6 and 13) is provided between the partition discs 69 and 70, and a second similarly curved deflector plate 74 is mounted in longitudinal alignment therewith between the discs 71 and 72. The concave side of each deflector plate is adapted to span the lowermost port in the valve liner 42, and either one or the other of the side ports of the valve chamber in which the deflector plate is mounted when the valve core is in either of its two adjusted operating positions shown in Figs. 14 and 15. The exposed edges of the deflector plates 73 and 74 are adapted to have wiping, sealing relation with the interior of the liner 42.

Figure 14:
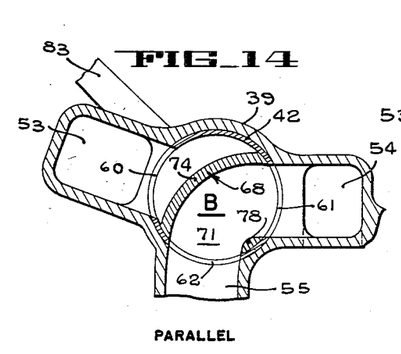
Fig. 14 is a diagrammatic fragmentary section in reduced scale taken along line 14—14 of Fig. 10, showing the valve core in one operative position for parallel operation of the pump.
Figure 15:
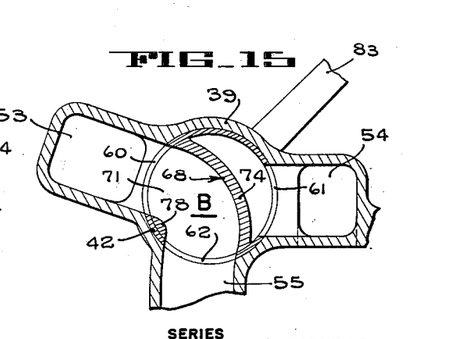
Fig. 15 is a view similar to Fig. 14 showing the valve core in its other operative position for series operation of the pump.

A post 77 (Fig. 13) extends between the discs 69 and 70 opposite the center of the concave side of the deflector plate 73, and a similar post 78 extends between the discs 71 and 72 opposite the center of the curved deflector plate 74. The posts 77 and 78 are adapted to be disposed between the valve ports spanned by the curved deflector plates 73 and 74 when the valve core is in either of its two operative positions of adjustment as shown in Figs. 14 and 15. Each of the posts 77 and 78 defines, with the deflector plate opposite thereto, a curved passage of constant cross sectional area through the valve core. The ends of each curved passage thus defined are of the same shape and size as the ports opening into the valve chamber in which the curved passage is located, and the ends of these curved passages are adapted to register with two of said sleeve ports in each adjusted position of the valve core.

An integrally cast central valve core portion 79 is of cruciform cross sectional shape, and rigidly connects the two inner partition discs 70 and 71 of the valve core. The outer edges of the cross shaped connecting portion 79 are relieved when casting as shown at 80 in Fig. 13 to provide adequate clearance between these edges and the valve liner 42, and thus to avoid the necessity for machining them. The cross shaped central core portion 79 has no other function than to provide a rigid connection between the two central discs 70 and 71, since no liquid flows through the central portion of the valve in either of the two adjusted positions of the valve core.

A stub shaft 75 (Figs. 6 and 10) extends axially from the valve core end disc 72 and is journaled in the axial opening 40 in the closed end of the valve housing 39. A second stub shaft 81 (Fig. 10) case integrally with the valve core 68, extends axially from the other end disc 69 and is journaled in a central opening in the valve housing closure plate 49. The stub shaft 81 is sealed in liquid tight relation with the closure plate 49 by a usual hydraulic sealing ring 82. A valve control handle 83 is secured to the stub shaft 81 by a Woodruff key 84 (Fig. 7) and a bolt 85. The swing of the control handle 83 is limited by a pair of abutment stops 87 and 88 (Figs. 6 and 7) cast integrally with the closure plate 49, and positioned to be engaged by a rib 89 provided longitudinally of the inner side of the control handle.

The valve core 68 is so mounted that when the valve control handle 83 is swung to one limit of its movement as determined by the abutment 87, the valve core 68 will be in one operative position, with the curved, aligned, deflector plates 73 and 74 in the position shown by the curved plate 74 in Fig. 15 while when the control handle 83 is swung to its other limit of movement to engage the abutment stop 88, the valve core 68 will be in its other operative position, with the aligned deflector plates 73 and 74 in the position shown by the plate 74 in Fig. 14.

The impeller section C comprises a substantially cylindrical housing portion 90 with an annular central partition 91 cast integrally therewith. A pair of usual volutes 92 and 93 (Figs. 8 and 10) are formed interiorly of the cylindrical portion 90 on opposite sides of the central partition 91. The volute 92 receives the liquid discharge by the first stage impeller wheel 57 and directs it upwardly through one passage 94 (Fig. 10) of a double passage conduit 95 cast integrally with the cylindrical impeller housing member 90, while the other volute 93 receives the liquid discharged by the second stage impeller wheel 59 and directs it upwardly into a second passage 97 of the double passage conduit 95.

The passage 94 in the double conduit 95 (Fig. 10) communicates at its upper end with the downwardly extending passage 55 from the valve housing, while the upper end of the passage 97 opens directly into the main discharge conduit 21 through the downwardly directed opening 67 therein. A flange 98 (Figs. 3, 5 and 6), provided around the upper end of the double passage conduit 95, is secured to the underside of the manifold A by cap screws 99 (Figs. 3 and 6).

A spacing sleeve 100 (Fig. 6) is mounted on an impeller drive shaft 101 to hold the oppositely facing impeller wheels 57 and 59 in proper axially spaced relation on the impeller shaft, the spacing sleeve being journaled in a bushing 106 mounted in the central opening of the annular partition 91. The impellers 57 and 59 are keyed to the impeller shaft 101 by Woodruff keys 102 and 103 (Fig. 8), respectively. The impellers and the spacer sleeve 100 are clamped between a snap ring 104 mounted in an annular groove in the impeller shaft 101 and a nut 105 screwed onto a threaded portion of the impeller shaft 101. The nut 105 is secured in adjusted position by a well known type of lock washer 107.

A second stage intake cap or suction housing 110 (Figs. 2, 4, 6 and 10) is fitted into the cylindrical impeller housing portion 90 to enclose the intake side of the second stage impeller 59, and is secured thereon by cap screws 111. The second stage intake cap 110 is on the forward end of the pump when the pump is mounted on an automotive vehicle. "Forward" and "rearward" and words of similar import, as used herein, are intended to mean toward the front or rear of such vehicle.

A usual wear ring 112 (Figs. 6 and 8) having a radially extending flange 113 thereon is interposed between the intake cap 110 and the second stage impeller wheel 59. The wear ring 112 is fitted into a circular opening in the intake cap 110 and the flange 113 is seated against the inner side of the intake cap around the opening in the intake cap properly to position the wear ring therein.

An upwardly extending second stage intake conduit 114 (Figs. 2, 5, 6, 9 and 10) is cast integrally with the intake cap 110, its upper end having an attaching flange 115 formed integrally thereon and secured to the underside of the manifold A by cap screws 117. A passage 118 (Fig. 10) in the second stage intake conduit 114 communicates at its upper end with the upwardly extending second stage intake passage 58 in the manifold A, which opens, through the port 64, into the valve chamber 76 in the end of the valve housing farthest from the main inlet conduit 20.

The lower end of the passage 118 opens into a curved channel 119 of usual diminishing cross sectional size formed in the intake cap 110 to direct the liquid flowing downwardly through the passage 118 axially into the eye of the second stage impeller 59. A usual dam 120, indicated in dotted lines in Fig. 5 is provided across the zone of minimum area of the intake channel to prevent pre- rotation of the liquid in the intake cap 110 before it is drawn into the eye of the impeller.

A bearing bushing 121 (Figs. 6 and 8) is mounted in an axial opening in a boss 122 centrally of the intake cap 110, and the forward end of the impeller shaft 101 is journaled in the bushing 121. A taper-threaded plug 123 is screwed into a correspondingly threaded opening centrally of the boss 122 axially beyond the end of the impeller shaft to seal off the opening.

A first stage intake cap or suction housing 124 is mounted over the other end of the cylindrical impeller housing 90 from that covered by the intake cap 110 and is secured thereto by cap screws 125. The first stage intake cap 124 has a curved intake channel 127 and dam 128 therein, as indicated in dotted lines in Fig. 5, similar to those in the second stage intake cap 110. The cap 124 also is provided with a wear ring 129 similar to the wear ring 112 for the second stage impeller 59. An intake conduit 130 for the first stage impeller 57 is formed integrally with the intake cap 124 and curves upwardly therefrom, its upper end being provided with an attaching flange 131 (Figs. 1, 5, 6 and 9) which is secured to the underside of the manifold A to register with the opening 66 (Figs. 6 and 10) which opens directly into the main inlet conduit 20.

The impeller drive shaft 101 (Figs. 6 and 8) extends rearwardly from the impeller section C through an opening in a central boss 132 of the first stage intake cap 124, and is sealed thereto by a conventional stuffing box 133 and gland 134.

An arched gear housing connecting flange 137 (Figs. 4, 5, 6 and 8) is cast integrally with the first stage intake cap 124 to overlie the rearwardly extending portion of the impeller shaft 101, and is provided with an upright mounting plate portion 138 on its rearward end. A ball bearing 139 (Fig. 8) is mounted in a flanged opening provided therefor in the upright plate portion 138 and is secured against axial displacement by a snap ring 135. The impeller shaft has journal support in this bearing 139. The plate portion 138 also has an annular centering flange 140 thereon concentric with the opening for the bell bearing 139, and this centering flange fits into an opening in the forward wall of a gear housing 141 (Figs. 3, 4, 5 and 8). The gear housing is secured to the plate portion 138 by cap screws 142.

A strong gear housing support bracket 143 is secured (Figs. 1, 3, 4, 5, 6 and 9) to a pad provided therefor on top of the gear housing, the other end of the bracket being secured to the underside of the manifold A. The strong support thus provided for the gear housing allows it to withstand the powerful torque stresses to which it is subjected by the operation of a parking brake mounted thereon in a manner to be described later herein.

Returning now to a further description of the rearward portion of the impeller shaft (Fig. 8), a spacing collar 147 is mounted on a reduced portion of the impeller shaft 101 between the inner race of the ball bearing 139 and a shoulder 148 formed by the reduction in diameter of the impeller shaft. A grease seal 149 is mounted in the bearing opening in the plate portion 138 forwardly of the ball bearing 139, and this seal has wiping, sealing engagement with the spacing collar 147. The spacing collar 147 is of slightly larger external diameter than the impeller shaft, and extends forwardly of the gear housing 141 beyond the grease seal 149, so that the collar 147 also acts as a slinger to cast outward by centrifugal force any water which might seep past the stuffing box 133 and creep rearwardly as a film along the impeller shaft.

Figures 7, 8:
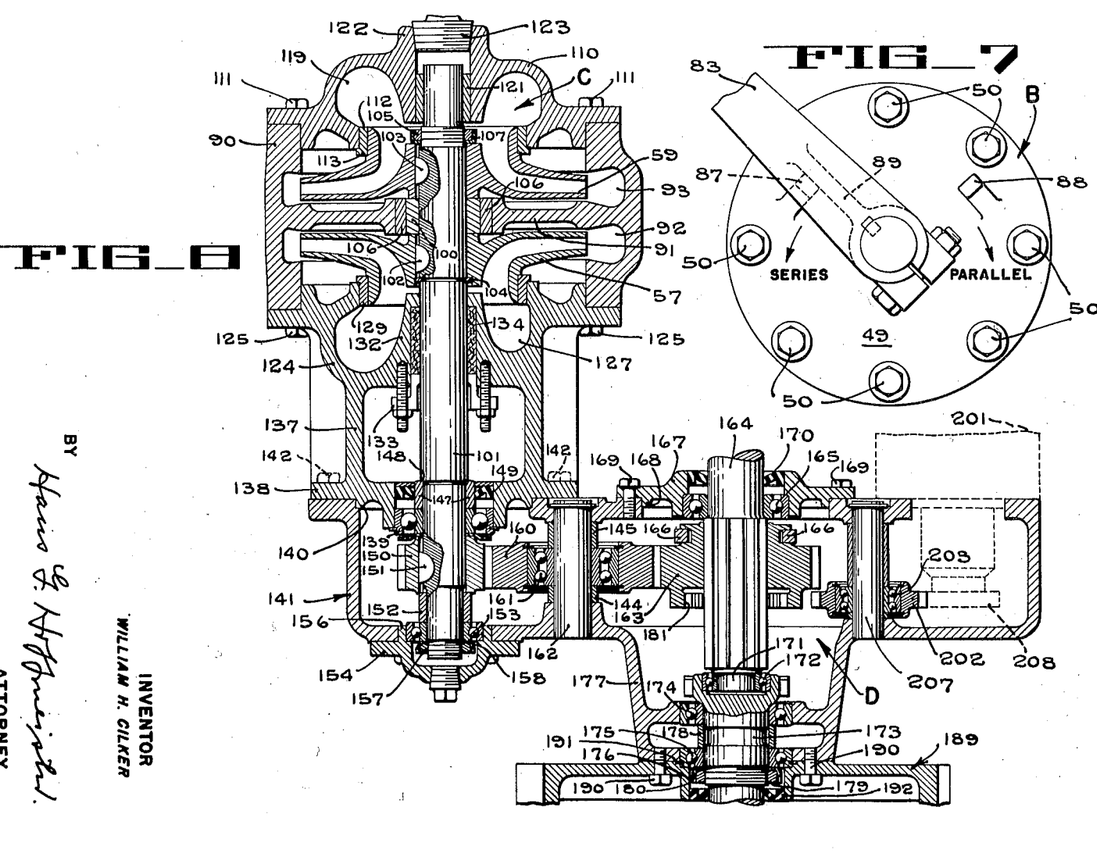
Fig. 7 is an enlarged fragmentary elevational view showing the closure plate across one end of the control valve housing and a portion of the valve operating handle looking in the direction of the arrows 7—7 in Fig. 6.
Fig. 8 is an enlarged section taken along line 8—8 of Fig. 3, portions of the drive shafts being broken away, and an optional primer pump being indicated in dotted lines.
Figure 9:
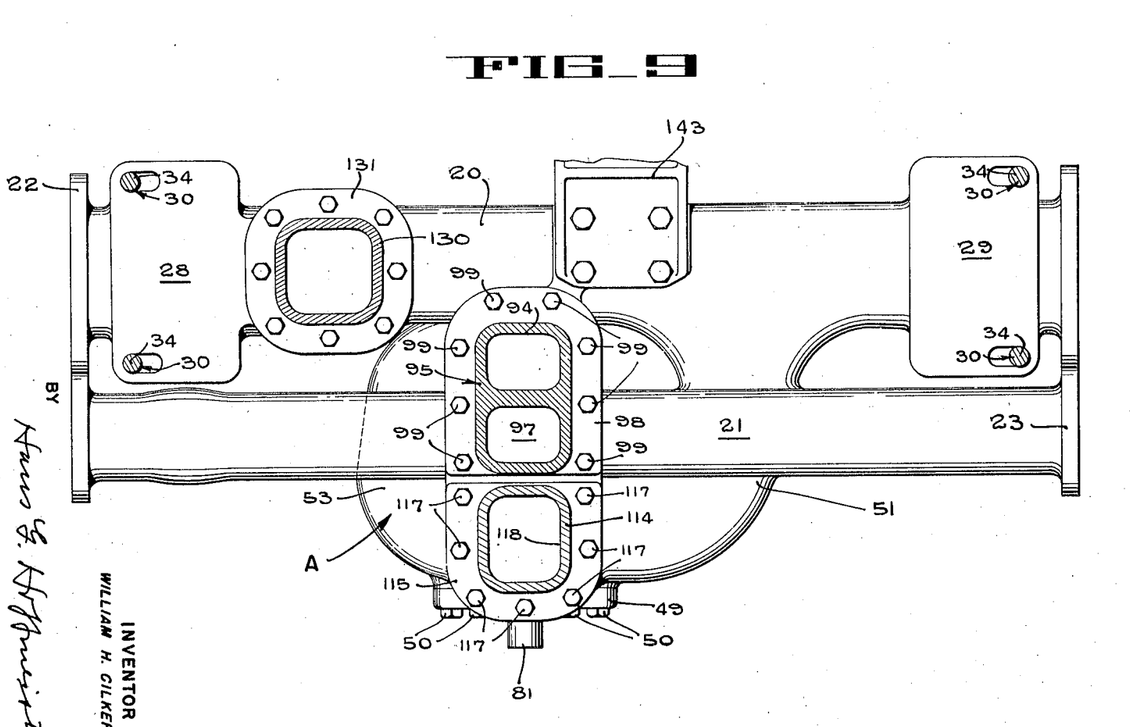
Fig. 9 is a section taken along line 9—9 of Fig. 3.

A drive element comprising a spur gear 150 is keyed to the first reduced portion of the impeller shaft 101 by a Woodruff key 151, and a spacing sleeve 152 is mounted on a further reduced portion of the shaft 101 to separate the gear 150 axially from the inner race of a ball bearing 153. The outer race of the bearing 153 is inserted in a recess provided therefor in a cap 154, secured to the gear housing by cap screws 155. A flange 156 on the cap 154 fits loosely into an opening in the gear case to permit the bearing 153 to be axially aligned with the bearing 139. A nut 157 screwed onto the threaded rear end of the impeller shaft 101 clamps the inner races of the bearings 139 and 153, the spur gear 150, the collar 147 and the sleeve 152 firmly together, at the same time forcing the spacing collar 147 tightly against the shaft shoulder 148. A lock washer 158 secures the nut 157 in adjusted position.

The spur gear 150 is of substantially smaller diameter than the opening in the gear housing 141 into which the centering flange 140 fits. In mounting the pump on an automotive vehicle care should be exercised to see that no portions of the pump assembly nor any of the necessary piping or wiring accessories are located immediately forwardly of the impeller section C. Therefore upon release of the plate portion 138 from the gear housing 141, and release of the impeller section conduits 95, 114 and 130 from the underside of the manifold A, the entire impeller section C is free to be moved forwardly, withdrawing the rearward portion of the impeller shaft and the spur gear and bearings assembled thereon from the gear housing.

Preferably the cap 154 over the end of the impeller shaft is removed before disassembling the impeller section C from the manifold and gear housing sections so as to entirely free the end of the impeller shaft from the gear housing. However, the fit between the outer race of the ball bearing 153 and the wall of the recess therefor in the cap 154 should be such as to permit relatively easy withdrawal of the bearing 153 from its seat, even if the cap 154 is left in place when removing the impeller section. A clearance of approximately one one-thousandth of an inch between the bearing 153 and the side wall of its recess in the cap has been found satisfactory.

An intermediate idler gear 160 is journaled on a double row ball bearing 161 mounted on a pin 162 secured in openings aligned lengthwise of the gear housing, and is positioned thereon by sleeves 144 and 145 so as to be in constant mesh with the spur gear 150 on the impeller shaft.

An internally splined gear 163 is slidably mounted on a correspondingly splined power driven shaft 164 to have driven relation therewith. The sliding gear 163 is adapted to be moved axially to selected adjusted positions on the shaft 164 in a well known manner by a usual shifting fork 166, the two arms of which (Fig. 8) are adapted to ride in a groove in a hub portion of the sliding gear 163. The splined shaft 164 is journaled in a ball bearing 165 mounted in a flanged opening in a plate 167 having a centering flange 168 thereon which fits into an opening in the forward wall of the gear housing 141 and is secured in position thereon by cap screws 169. The splined shaft 164 extends forwardly and is connected to the usual transmission housing (also not shown) of the automotive vehicle upon which the pump is mounted. A grease seal 170 is mounted ahead of the ball bearing 165 to have wiping sealing engagement with the shaft 164.

The rear end portion 171 of the splined shaft 164 (Fig. 8) is reduced in diameter and has the inner race of a ball bearing 172 fitted thereon. The outer race of the ball bearing 172 is fitted into an axial recess in the forward end of a short shaft 173 journaled in a pair of ball bearings 174 and 175. Th outer races of the bearings 174 and 175 are mounted in annular seats provided therefor in the rearward end of a conical extension 177 of the gear housing 141. The inner races of the bearings 174 and 175 are retained in proper axially separated position on the short shaft 173 by a spacer 178 and are secured in position by a nut 179, screwed onto a threaded portion of the short shaft 173 and retained by a lock washer 180.

The sliding gear 163 has an internally toothed concentric ring portion 181 formed integrally on the rearward side thereof, the internal teeth of the portion 181 being adapted to receive the correspondingly externally toothed forward end of the short shaft 173 to provide direct driving connection between the splined shaft 164 and the short shaft 173. When not thus engaged, however, the splined, power driven shaft 164 is free to rotate on the ball bearings 165 and 172 relatively to the short shaft 173.

The short shaft 173 is adapted to be connected by a conventional type of universal joint, not shown, to a rearwardly extending conventional vehicle drive shaft, also not shown, to provide driving connection between the short shaft 173 and the rear wheels of the vehicle upon which the pump is mounted. A conventional parking brake drum 182 (Fig. 1) is fitted and keyed to a tapered portion of the short shaft 173 which projects rearwardly beyond the gear housing 141, and a conventional parking brake band 183 is mounted on end abutments 187 and 188 of a brake band mounting bracket 189 (Figs. 1, 3, 4, 6 and 8). The bracket 189 is secured by cap screws 190 onto the rear end of the tapered rearward extension 177 of the gear housing 141, and has a flanged central opening 176 (Fig. 8) therein to permit the short shaft 173 to pass therethrough. A snap ring 191 inserted in a peripheral groove in the outer race of the ball bearing 175 is gripped between the brake band mounting bracket 189 an the tapered rearward extension 177 to secure the bearing against displacement. A grease seal 192 is mounted in the flanged opening 176 rearwardly of the nut 179 to have wiping sealing engagement with the shaft 173.

The brake band 183 is adapted to be connected by usual cables and rods, not shown, to a conventional brake actuating lever, also not shown, so that the band 183 can be drawn into frictional engagement with the brake drum 182 to apply braking stresses to the short shaft 173, and thence to the drive wheels of the vehicle. The strong, rigid support for the gear housing section D provided by the bracket 143 which secures it to the manifold A, and the upright plate portion 138 and arched plate portion 137 which secures the gear housing to the impeller section C, assures ability to absorb the braking stresses imposed on the brake band mounting bracket 189, and to transmit these stresses to the vehicle frame members upon which the manifold section A is mounted. Previously it has been necessary to devise and build some sort of auxiliary support from the vehicle frame for mounting a parking brake on the drive shaft to the vehicle wheels, and such construction has added considerably to the cost of installing the pump in a vehicle, has required the use of a short drive shaft, and in many cases has required excessive maintenance.

The shifting fork 166 (Fig. 8) is mounted on a conventional sliding bar 194 (Fig. 6) which rides in the axially aligned bores of a pair of tubes 197 and 198 inserted in holes provided therefor in opposite walls of the gear housing member 141. The guide tube 198 is capped at 199, and the other guide tube 197 has a usual packing nut 200 thereon to prevent the escape of grease from the gear housing along the sliding gear shift bar 194. The sliding bar 194 is connected by usual means, not shown, to a gear shift control lever, also not shown, mounted conveniently to an operator.

Means for priming the pump may comprise a well known type of positive displacement primer pump 201, indicated in dotted lines in Fig. 8. An idler gear 202 for driving the primer pump is journaled on a double row ball bearing 203, mounted on a pin 207 secured in axially aligned openings in the front and rear walls of the gear case. The inner race of the bearing 203 is retained, by spacers 204 and 205, in axially adjusted position on the pin 207. The idler gear 202 is in constant mesh with a gear 208 (indicated in dotted lines in Fig. 8) secured to the shaft of the primer pump 201. The priming means is here illustrated as of the vacuum type and is connected to apply suction to the inlet conduit 20 and to the pumps passages opening thereto by means of a pipe 209 (Figs. 1, 2, 3, 4 and 5). The pipe 209 opens into the transversely extending branch inlet passage 51 in the manifold section A. Since the priming means forms no part of the present invention, and since any one of a number of well known priming means can be readily employed with a pump embodying the present invention, no details of the priming means itself are necessary for a complete understanding of the invention.

To place the illustrated form of primer pump in operation the sliding gear 163 may be moved rearwardly from the position illustrated in Fig. 8 a sufficient distance to bring it in mesh with the intermediate idler gear 202 so as to drive the primer pump 201 only. After priming, the sliding gear 163 may be shifted forwardly to the position shown in Fig. 8 to release the priming pump idler gear 202, and to move the sliding gear 163 into fully meshed engagement with the impeller idler gear 160. The power driven splined shaft 164 may be connected in a conventional manner to any suitable prime mover, such as the engine, not shown, of the fire truck upon which the pump is mounted.

A conventional by-pass type of pressure relief valve 211 (Figs. 3 and 4) is mounted to communicate between the main discharge conduit 21 and the main inlet conduit 20 to permit liquid to flow from the discharge conduit into the inlet conduit when the discharge pressure exceeds the intake pressure by a predetermined maximum.

*Operation*

In starting the pump, regardless of whether it is desired to operate it in series or in parallel, if the pump is dry, and no source of liquid under pressure is available, priming is usually required. In the illustrated form of the invention priming is accomplished by moving the splined sliding gear 163 rearwardly from its position shown in Fig. 8, so that it will be in mesh with the idler gear 202.

Power driven rotation of the splined shaft 164 then will operate the primer pump 201, causing it to withdraw air through the pipe 209 from the transversely extending branch inlet passage 51 to create a partial vacuum in this passage and in the manifold, valve and pump passages opening thereto, including the main inlet conduit 20 (Figs. 4, 5, 11 and 12). During suction priming it is necessary to have all passages opening into the pump and manifold except the pipe 209 and the main inlet conduit 20 closed to prevent the sucking of air therein. The main inlet conduit 20 is connected to a suitable supply of liquid such as a lake or stream, by immersing the open end of a usual suction hose, not shown, therein. After the prime is obtained the primer pump 201 may be de-energized and the main pump energized by releasing the clutch (not shown) of the vehicle upon which the pump is mounted, and sliding the gear 163 to the position illustrated in Fig. 8.

With the pump primed and the impellers 57 and 59 driven to rotate at a suitable speed, for example 1960 R. P. M. for a pump having impellers nine inches in diameter and the control valve core 68 adjusted to the position illustrated in Fig. 14 for parallel operation, a pump made approximately in accordance with the accompanying drawings was found to have a capacity of approximately 500 gal. per min. at an outlet pressure of 120 pounds per square inch against a lift of sixteen feet with atmospheric pressure approximately that of sea level.

In all three of the somewhat diagrammatic sectional views of Figs. 10, 11 and 12 the paths of the liquid flowing to and from the first stage impeller 57 are indicated by dash and one dot lines, while the paths of the liquid flowing to and from the second stage impeller 59 are indicated by dash and two dot lines.

For operating the pump in parallel, the valve control handle 83 is swung over until it is arrested by the stop 88, thereby turning the valve core 68 to the adjusted position illustrated in Fig. 14. With the valve core 68 thus positioned for parallel operation, the curved deflector plate 74 (Figs. 6, 11 and 14) seals off the port 60 (Fig. 11) to one end of the curved crossover passage 53, and communicates the upward passage 55 from the discharge side of the first stage impeller 57 through the ports 62 and 61 with the short curved manifold passage 54, which in turn opens into the main discharge conduit 21.

Also, in this same position of the valve core, the second curved deflector plate 73 (Fig. 6) seals off the port 63 (Fig. 11) to the other end of the curved crossover passage 53, and communicates the upward passage 58 (Fig. 10) which leads to the intake side of the second stage impeller 59 through the ports 64 and 65, with the curved transversely extending branch passage 51 (Fig. 11) from the main inlet conduit 20. With the control valve core 68 thus moved to the adjusted position illustrated in Fig. 14 for parallel operation, and the liquid flowing along the paths indicated in Figs 10 and 11, liquid is drawn from a suitable supply through usual inlet hoses, not shown, into either or both ends of the main inlet conduit 20 of the manifold A as desired.

From the main inlet conduit 20, part of the incoming liquid is drawn downwardly through the opening 66 in the under side of the main inlet conduit 20, through the first stage intake conduit 130, through the curved channel 127 in the first stage intake cap 124 and into the eye of the first stage impeller 57 (Fig. 10). The dam 128 (Fig. 5) prevents pre-rotation of the liquid in the curved channel 127 of the intake cap 124. The first stage impeller 57 discharges the liquid into the volute 92, whence it is driven upwardly (Fig. 10) through the passage 94 in the double passage conduit 95 and through the manifold passage 55 and the port 62 into the valve chamber 86. Here the curved valve core deflector plate 74 (Figs. 6, 13 and 14) diverts the liquid through the liner port 61 into the short passage 54 (Figs. 10, 11 and 14) and thence into the main discharge conduit 21.

Simultaneously with this flow of liquid through the first stage impeller, liquid is drawn from the main inlet conduit 20 (Fig. 11) through the transversely extending branch inlet passage 51 and through the side port 65 in the liner 42 into the valve chamber 76 (Fig. 6). Here the curved deflector plate 73 directs the liquid downwardly through the liner port 64 (Figs. 6, 10 and 11), through the upright passage 58 in the manifold A, through the passage 118 in the second stage intake conduit 114, around the curved channel 119 in the intake nozzle cap 110 and thence into the eye of the second stage impeller 59 (Figs. 6, 8 and 10). The liquid is driven through the impeller into the second stage volute 93, whence it is forced upwardly through the second passage 97 in the double passage conduit 95, and through the manifold opening 67 (Figs. 10 and 11) directly into the main discharge conduit 21.

To convert the pump from parallel to series operation, the control handle 83 is swung over until it is arrested by the abutment stop 87 (Figs. 6 and 15) thereby positioning the curved deflector plates 73 and 74 in their other adjusted position as illustrated in Fig. 15. While it is difficult to turn the valve core manually when the pump is operating at the extreme discharge pressures of which it is capable, due to the side pressure on the curved deflector plates 73 and 74, the switchover between parallel and series operation can be made while the pump is operating at substantially its mid-range of pressure when operating in parallel without danger of damaging either the pump or the valve. This is a decided improvement over some other types of series parallel pumps which, as is well known to those familiar with the art, are apt to be damaged if an attempt is made to switch them over from series to parallel operation or the reverse while the pump is operating under substantial pressure.

With the valve core 68 adjusted to its position for series operation as shown in Fig. 15, the liquid flows through the pump along the flow paths indicated by the broken lines in Figs. 10 and 12. The liquid is drawn in through the main inlet conduit 20, passes downwardly through the opening 66 in the underside of the main inlet conduit, through the first stage intake conduit 130 and the curved channel 127 in the intake cap 124 into the eye of the first stage impeller 57 (Figs. 6, 7, 10 and 11). Thence the liquid is discharged by the first stage impeller into the volute 92 and is forced upwardly through the passage 94 in the double passage conduit 95, through the upward passage 55, in the manifold A and through the port 62 into the valve chamber 86.

The curved deflector plate 74 seals off the port 61 to the main discharge conduit and directs the liquid through the port 60 and the crossover passage 53 to the other valve chamber 76, where the other curved deflector plate 73 directs the liquid downwardly through the upright passage 58 (Fig. 10) in the manifold A, through the passage 118 in the second stage intake conduit 114 and into the curved channel 119 in the second stage intake cap 110. Here the liquid is drawn into the eye of the second stage impeller 59 (Figs. 6, 7 and 10) is driven through the impeller 59 and is discharged into the second stage volute 93, whence it is forced upwardly through the pasage 97 in the double passage conduit 95 and through the opening 67 directly into the main discharge conduit 21.

It will be noted, particularly in Figs. 14 and 15, that in both adjusted positions of the valve core the ends of each channel through the valve core register with the ports opening into the valve chamber in which it is located, and that the direction of flow of liquid through the passages in the valve core is reversed in the two adjusted positions of the valve core.

Theoretically, when a series parallel pump is changed from parallel to series operation the pressure of the discharged liquid is doubled and the output volume is halved; so that a pump of this character having an output of 500 gallons per minute at a pressure of 120 lbs. per square inch when operating in parallel, would, when operated in series, under the same conditions, have a theoretical output of 250 gallons per minute at a pressure of 240 lbs. per square inch. Since, however, the power of output of the prime mover employed to drive the pump ordinarily will not maintain the same speed, and since other factors also vary slightly under the two sets of conditions, the relative values are only approximate.

It should be noted that the present invention allows designing of smoothly contoured passages throughout the entire pump without abrupt changes either in liquid direction, or in the cross sectional shape or size of the passages whether the pump is operating in series or in parallel. Such passages minimize the creating of eddy currents and back pressures, and high pumping efficiency can thus be attained even when operating under overload conditions. Other advantages of the present invention include the complete absence of back pressure valves and the ability to remove and replace the impeller section without disturbing other parts of the pump or the vehicle upon which it is mounted. The incorporation of the parking brake as an element of the pump greatly facilitates installation of the pump in automotive vehicles and tends to minimize maintenance requirements on this item.

While I have illustrated and described a preferred embodiment of the present invention, it will be understood, however, that various changes and modifications may be made in the details thereof without departing from the spirit and scope of the invention as set forth in the appended claims.

Having thus described the invention what I claim as new and desire to protect by Letters Patent is as follows:

1. A series parallel pump comprising a pair of impellers, a main inlet conduit and a main outlet conduit, a valve housing having two spaced wall portions enclosing separate valve chambers, each of said wall portions having a plurality of ports therein, a first pair of said ports opening one from each of said wall portions to one of said impellers, a second pair of said ports opening one from each of said wall portions to one of said main conduits, a third pair of said ports opening to each other, and valve means mounted in the chambers of said valve housing for movement between predetermined adjusted positions therein, said valve means being constructed and arranged, in one adjusted position thereof, openly to communicate each of said first ports with said second port in the same wall portion therewith while closing off said third ports, and in another adjusted position of said valve means openly to communicate each of said first ports with said third port in the same wall portion therewith while closing off said second ports.

2. A series parallel pump comprising a pair of impellers, a main inlet conduit and a main outlet conduit, a valve housing having two spaced wall portions therein, each of said wall portions having a plurality of ports therein, a first pair of said ports opening one from each of said wall portions to one of said impellers, a second pair of said ports disposed at one side of said first ports and opening one from each said wall portions to one of said main conduits, a third pair of said ports disposed at the other side of said first ports and opening to each other, and valve means mounted in said valve housing for movement to two adjusted positions therein, said valve means having a pair of passages therethrough arranged, in one adjusted position of said valve means, to align, respectively, with the said first and second ports in each of said wall portions, and in the other adjusted position of said valve means, to align, respectively, with the said first and third ports in each of said wall portions.

3. A series parallel pump comprising an impeller housing, a pair of impellers mounted therein, a main inlet conduit and a main outlet conduit opening into said impeller housing, a valve body mounted adjacent said impellers, wall members defining a plurality of passages including a first pair of passages opening one from each pump impeller into said valve body, a crossover passage having the ends thereof opening into said valve body adjacent said first pair of passages, and a second pair of passages opening one from each main conduit into said valve body adjacent a passage of said first pair thereof, and valve means mounted in said valve body across the ends of said passages opening therein, said valve means being movable between two predetermined positions, and arranged, in one of said predetermined positions of the valve means, to communicate said first pair of passages with said crossover passage, and in the other of said predetermined positions of the valve means, to communicate each of said first pair of passages with a passage of said second pair thereof.

4. A series parallel pump comprising a first stage pump, a second stage pump, a main inlet conduit openly connected to the intake side of the first stage pump, a main discharge conduit openly connected to the discharge side of the second stage pump, a first valve chamber open to the discharge side of the first stage pump and to said main discharge conduit, a second valve chamber open to the intake side of the second stage pump, and to said main inlet conduit, means providing a flow passage communicating said valve chambers with each other, valve means mounted in said valve chambers and operable to a first position to communicate each of said pumps with one of said main conduits and to close off communication between said flow passage and the valve chambers, said valve means being operable to a second position to close off the valve chambers from the main conduits and to communicate the valve chambers with said flow passage, thereby to communicate the discharge side of the first stage pump with the intake side of the second stage pump.

5. A series parallel pump comprising a first stage pump, a second stage pump, a main inlet conduit openly connected to the intake side of the first stage pump, a main discharge conduit openly connected to the discharge side of the second stage pump, a pair of valve chambers, each of said valve chambers having a first port therein communicating, respectively, with each of said pumps, each of said valve chambers having a second port therein, means defining a conduit communicating said second ports with each other, each of said valve chambers having a third port therein, the third port of each chamber being in communication with the main conduit not associated with the first port of that chamber, and valve means mounted in said valve chambers, said valve means being movable to one operative position opening said first ports in each valve chamber to said second ports therein, and simultaneously closing said third ports, and having a second operative position opening said first ports in each valve chamber to said third ports therein and simultaneously closing said second ports.

6. A series parallel pump comprising a first stage pump, a second stage pump, a main inlet conduit openly connected to the intake side of the first stage pump, a main discharge conduit openly connected to the discharge side of the second stage pump, a first valve chamber openly connected to the discharge side of the first stage pump, and to the main discharge conduit, a second valve chamber openly connected to the intake side of the second stage pump, and to the main inlet conduit, wall members defining a crossover passage openly connecting the two valve chambers to each other, and valve means mounted in said valve chambers and operable selectively to open and to close off communication between said first and second stage pumps and said main conduits, and, in the same order, to close off and to open communication between the discharge side of the first stage pump and the intake side of the second stage pump through the crossover passage.

7. A series parallel pump comprising a first stage pump, a second stage pump, a main inlet conduit openly connected to the intake side of the first stage pump, a main discharge conduit openly connected to the discharge side of the second stage pump, a first valve chamber, a second valve chamber spaced from the first valve chamber, wall members defining a plurality of passages including a first passage from said first valve chamber to the discharge side of the first stage pump, a second passage from said first valve chamber to the main discharge conduit, a third passage from said second valve chamber to the intake side of the second stage pump, a fourth passage from said second valve chamber to the main inlet conduit, and a crossover passage from said first valve chamber to the second chamber, and a valve mounted in said valve chambers, said valve having a liquid directing passage therein in each valve chamber, said valve having a first operative position aligning the valve passages with the ends of said crossover passage, said valve having a second operative position aligning said valve passages in said first and second chambers, respectively, with the passages to the main discharge and inlet conduits, opposite ends of said valve passages being aligned with said passages from the valve chambers to said pumps in the two operative positions of the valve means.

8. A series parallel pump comprising a manifold adapted to be mounted transversely of a pair of vehicle frame members, a main inlet conduit and a main discharge conduit formed in said manifold, an impeller housing secured to said manifold for support thereby, a pair of impellers rotatably mounted in said impeller housing, a valve housing formed in said manifold to have two separate chambers therein, wall members defining a crossover passage opening from one of said chambers to the other, and valve means mounted in said chambers, said valve means having one operative position openly communicating the discharge side of one of said impellers with the main discharge conduit through one of said chambers, and simultaneously openly communicating the intake side of the other impeller with the main inlet conduit through the other of said chambers, said valve means having a second operative position openly communicating the discharge side of said one impeller with the intake side of said other impeller through both of said chambers and said crossover passage.

9. In combination, a pumping arrangement comprising an impeller pump having an inlet eye, a valve housing having a pair of flow chambers, a separate inlet conduit arranged to deliver liquid to each flow chamber, a separate discharge conduit arranged to receive liquid from each flow chamber, one of said discharge conduits being arranged to direct liquid from one of said chambers into the inlet eye of said impeller pump, a conduit intercommunicating said chambers, and an apertured valve in said flow chambers for cutting off the flow of liquid to said one chamber from its associated inlet conduit and cutting off the flow of liquid from the other chamber to its associated discharge conduit and directing liquid from said other chamber to said one chamber for discharge through said one discharge conduit to the eye of said impeller pump.

10. In combination, a valve housing having a first and a second flow chamber, separate inlet conduits communicating with each flow chamber, separate discharge conduits arranged to receive liquid from each chamber, a conduit arranged to communicate said first chamber with said second chamber, a first pump connected between one of said inlet conduits and said first flow chamber, a second pump connected to said second flow chamber through the associated discharge conduit, means for driving said pumps to force separate streams of liquid through said chambers, and a valve disposed in said valve housing and arranged to disconnect said second flow chamber from the associated inlet passage and establish communication between said two flow chambers to connect said pumps in series.

References Cited in the file of this patent

UNITED STATES PATENTS

| | | |
|---|---|---|
| 53,937 | Ruthven | Apr. 10, 1866 |
| 123,606 | Baily | Feb. 13, 1872 |
| 810,877 | McKeown | Jan. 23, 1906 |
| 1,010,158 | Lent | Nov. 28, 1911 |
| 2,112,651 | Fox | Mar. 29, 1938 |
| 2,422,415 | Howe | June 17, 1947 |
| 2,440,560 | Sheppard | Apr. 27, 1948 |
| 2,526,982 | Vonk | Oct. 24, 1950 |
| 2,571,105 | Bickel | Oct. 16, 1951 |

FOREIGN PATENTS

| | | |
|---|---|---|
| 116,423 | Switzerland | July 1, 1925 |
| 520,087 | Great Britain | Apr. 15, 1940 |